(12) United States Patent
Chung et al.

(10) Patent No.: US 12,345,986 B2
(45) Date of Patent: Jul. 1, 2025

(54) ELECTRONIC DEVICE WITH SWITCHABLE MODES

(71) Applicant: InnoLux Corporation, Miao-Li County (TW)

(72) Inventors: De-Cheng Chung, Miao-Li County (TW); Hsu-Kuan Hsu, Miao-Li County (TW); En-Hsiang Chen, Miao-Li County (TW); Chih-Chin Kuo, Miao-Li County (TW); Tzu-Chieh Lai, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 18/403,149

(22) Filed: Jan. 3, 2024

(65) Prior Publication Data

US 2024/0264496 A1 Aug. 8, 2024

(30) Foreign Application Priority Data

Feb. 3, 2023 (CN) .......................... 202310053379.1

(51) Int. Cl.
*G02F 1/1347* (2006.01)
*G02B 27/01* (2006.01)

(52) U.S. Cl.
CPC ...... *G02F 1/13476* (2013.01); *G02B 27/0101* (2013.01)

(58) Field of Classification Search
CPC .............. G02F 1/1334; G02F 1/13342; G02F 1/13345; G02F 1/13347; G02F 1/1335; G02F 1/1343; G02F 1/134363; G02F 1/134372; G02F 1/1347; G02F 1/13475; G02F 1/13476; G02F 1/13775; G02B 27/0101; B60J 3/04; B60J 3/06

See application file for complete search history.

(56) References Cited

U.S. PATENT DOCUMENTS

| | | | | |
|---|---|---|---|---|
| 5,296,952 A | * | 3/1994 | Takatsu | G02F 1/13476 349/88 |
| 11,347,096 B1 | * | 5/2022 | Kingman | E06B 9/24 |
| 2002/0085284 A1 | * | 7/2002 | Nakamura | G02B 1/11 359/601 |

(Continued)

FOREIGN PATENT DOCUMENTS

| | | |
|---|---|---|
| CN | 106918963 A | 7/2017 |
| CN | 114274744 A | 4/2022 |

OTHER PUBLICATIONS

Jae-Won Huh, Byeong-Hun Yu, Joon Heo, and Tae-Hoon Yoon, Double-layered light shutter using long-pitch cholesteric liquid crystal cells, 3792 vol. 54, No. 12 / Apr. 20, 2015 / Applied Optics.

*Primary Examiner* — Shan Liu
(74) *Attorney, Agent, or Firm* — MUNCY, GEISSLER, OLDS & LOWE, P.C.

(57) ABSTRACT

An electronic device with switchable modes includes a light scattering switching element, a light absorbing switching and an image generating element. The light absorbing switching element is disposed adjacent to the light scattering switching element. The image generating element is provided for generating an image. In a projection mode, the image generated by the image generating element sequentially passes through the light scattering switching element and the light absorbing switching element to be displayed.

18 Claims, 7 Drawing Sheets

(56) References Cited

U.S. PATENT DOCUMENTS

| | | | |
|---|---|---|---|
| 2008/0094551 A1* | 4/2008 | Hayashi | G02F 1/13475 |
| | | | 349/106 |
| 2013/0082986 A1* | 4/2013 | Yamauchi | H04N 9/3102 |
| | | | 349/5 |
| 2016/0202512 A1* | 7/2016 | Chen | G02F 1/1334 |
| | | | 349/12 |

* cited by examiner

ELECTRONIC DEVICE WITH SWITCHABLE MODES

CROSS-REFERENCE TO RELATED APPLICATIONS

This application claims the benefits of the Chinese Patent Application Serial Number 202310053379.1, filed on Feb. 3, 2023, the subject matter of which is incorporated herein by reference.

BACKGROUND

Field of the Disclosure

The present disclosure relates to an electronic device with switchable modes and, more particularly, to an electronic device capable of being switched to a light shielding mode or a light transmitting mode.

Description of Related Art

Currently, on the market, the driver seat is usually equipped with a foldable sun visor in automobiles or vehicles.

However, the prior sun visor does not have the function of being switched to light shielding or light transmitting, and thus manual adjustment is often required when using or storing the sun visor, while the sun visor will block part line of sight of the driver during use, which is likely to cause accidents.

Therefore, there is an urgent need to provide an adjustable sun visor in order to mitigate and/or obviate the aforementioned defects.

SUMMARY

The present disclosure provides an electronic device with switchable modes, which comprises: a light scattering switching element; a light absorbing switching element disposed adjacent to the light scattering switching element; and an image generating element for generating an image, wherein, in a projection mode, the image generated by the image generating element sequentially passes through the light scattering switching element and the light absorbing switching element to be displayed.

Other novel features of the disclosure will become more apparent from the following detailed description when taken in conjunction with the accompanying drawings.

DETAILED DESCRIPTION OF EMBODIMENT

Figure 1:
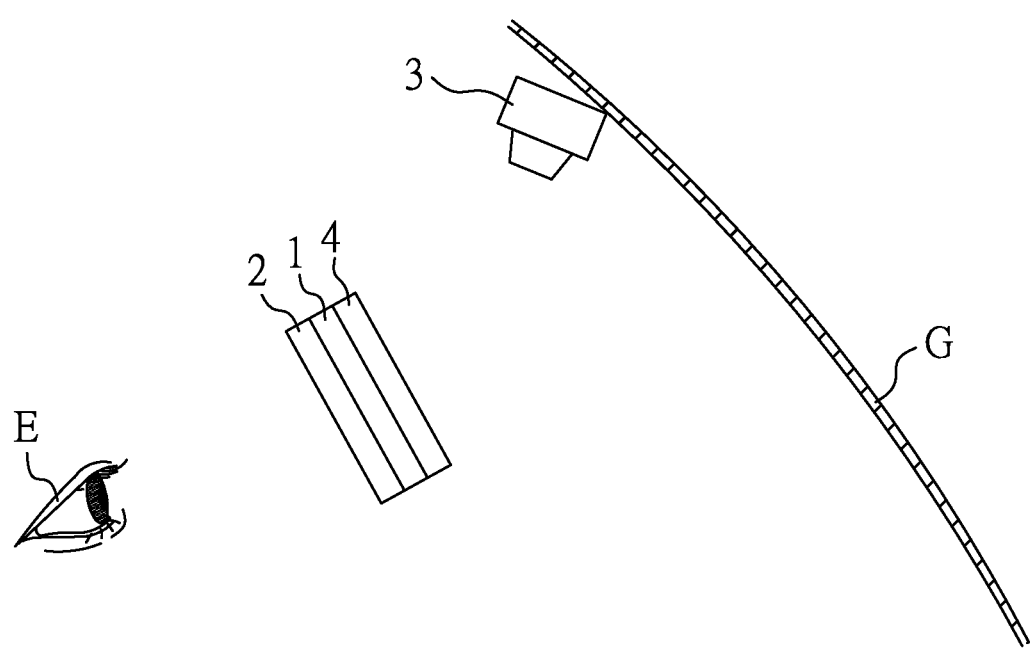
FIG. 1 is a schematic diagram of part of an electronic device according to an embodiment of the present disclosure.

The following disclosure provides many different embodiments or examples for implementing different elements in the provided display device. Specific examples of each element and its configuration are described below to simplify the embodiments of the present disclosure. Of course, these are just examples, not intended to limit the present disclosure. For example, if the description mentions that a first element is formed on a second element, it may include an embodiment in which the first and second elements are in direct contact, and may also include an additional element formed between the first and second elements, so that they are not in direct contact. In addition, the embodiments of the present disclosure may repeat element symbols and/or characters in different examples. This repetition is for brevity and clarity and is not intended to represent a relationship between the different embodiments and/or aspects discussed.

Directional terms mentioned in the specification, such as "up", "down", "front", "rear", "left", "right", etc., only refer to the directions of the drawings. Accordingly, the directional term used is illustrative, not limiting, of the present disclosure.

In some embodiments of the present disclosure, terms such as "connection" and "interconnection" about joining and connecting, unless otherwise specified, may mean that two structures are in direct contact, or may also mean that two structures are not in direct contact, where other structures are placed between the two structures. Moreover, the terms about joining and connecting may also include the situation that both structures are movable, or both structures are fixed. In addition, the term "coupled" or "electrically connected" includes any direct and indirect means of electrical connection.

In the specification and claims, unless otherwise specified, ordinal numbers, such as "first" and "second", used herein are intended to distinguish elements rather than disclose explicitly or implicitly that names of the elements bear the wording of the ordinal numbers. The ordinal numbers do not imply what order an element and another element are in terms of space, time or steps of a manufacturing method. Thus, what is referred to as a "first element" in the specification may be referred to as a "second element" in the claims. The terms, such as "about", "equal to", "equal" or "same", "substantially", or "substantially", are generally interpreted as within 20% of a given value or range, or as within 10%, 5%, 3%, 2%, 1%, or 0.5% of a given value or range.

Furthermore, any two values or directions used for comparison may have certain errors. If the first value is equal to the second value, it implies that there may be an error of about 10% between the first value and the second value. If the first direction is perpendicular or "substantially" perpendicular to the second direction, the angle between the first direction and the second direction may be between 80 degrees and 100 degrees. If the first direction is parallel or "substantially" parallel to the second direction, the angle between the first direction and the second direction may be between 0 degrees and 10 degrees.

Unless otherwise defined, all terms (including technical and scientific terms) used herein have the same meaning as commonly understood by those skilled in the art related to the present disclosure. It can be understood that these terms, such as those defined in commonly used dictionaries, should be interpreted as having meaning consistent with the relevant technology and the background or context of the present disclosure, and should not be interpreted in an idealized or excessively formal way. Unless there is a special definition in the embodiment of the present disclosure.

Some variations of the embodiments are described below. In the different drawings and described embodiments, similar reference numerals are used to designate similar elements. It can be understood that additional operations may be provided before, during and after the method, and some described operations may be replaced or deleted for other embodiments of the method.

It should be understood that, according to the disclosed embodiments, an optical microscope (OM), a scanning electron microscope (SEM), a film thickness profilometer (α-step), an ellipsometer thickness gauge, or other suitable means may be used to measure the depth, thickness, width or height of each component, or the spacing or distance between components. According to some embodiments, a scanning electron microscope may be used to obtain a cross-sectional structure image including the components to be measured, and measure the depth, thickness, width or height of each component, or the spacing or distance between components.

In the present disclosure, the electronic device may include a display device, a backlight device, an antenna device, a sensing device or a tiled device, but it is not limited thereto. The electronic device may be a bendable or flexible electronic device. The display device may be a non-self-luminous display device or a self-luminous display device. The antenna device may be a liquid crystal type antenna device or a non-liquid crystal type antenna device, and the sensing device may be a sensing device for sensing capacitance, light, thermal energy or ultrasonic waves, but it is not limited thereto. Electronic components may include passive components and active components, such as capacitors, resistors, inductors, diodes, transistors, and the like. The diodes may include light emitting diodes or photodiodes. The light emitting diodes may, for example, include organic light emitting diodes (OLEDs), sub-millimeter light emitting diodes (mini LEDs), micro light emitting diodes (micro LEDs) or quantum dot light emitting diodes (quantum dot LEDs), but it is not limited thereto. The tiled device may be, for example, a display tiled device or an antenna tiled device, but it is not limited thereto. It should be noted that the electronic device may be any permutation and combination of the aforementioned, but it is not limited thereto. In the following, the display device is used as an electronic device or a tiled device to illustrate the content of the present disclosure, but the present disclosure is not limited thereto.

In addition, the shape of the electronic device may be rectangular, circular, polygonal, with curved edges or other suitable shapes. The electronic device may have peripheral systems such as a processing system, a driving system, a control system, a light source system, and a shelf system to support a display device or a tiled device.

It should be noted that the electronic device may be arranged in any combination as mentioned above, but it is not limited thereto. It should be noted that in the following embodiments, without departing from the spirit of the present disclosure, features in several different embodiments may be replaced, reorganized, and mixed to complete other embodiments. As long as the features of the various embodiments do not violate the spirit of the present disclosure or conflict with each other, they can be mixed and matched arbitrarily.

Unless otherwise defined, all terms (including technical and scientific terms) used herein have the same meaning as commonly understood by one of ordinary skill in the art to which this disclosure belongs. It can be understood that these terms, such as those defined in commonly used dictionaries, should be interpreted as having meanings consistent with the related technology and the background or context of the present disclosure, and should not be interpreted in an idealized or overly formal manner, unless otherwise specified in the embodiments of the present disclosure.

It should be noted that the technical solutions provided in different embodiments below may be replaced, combined or mixed to form another embodiment without violating the spirit of the present disclosure.

FIG. 1 is a schematic diagram of part of an electronic device according to an embodiment of the present disclosure.

In one embodiment of the present disclosure, as shown in FIG. 1, the electronic device may include: a light scattering switching element 1; a light absorbing switching element 2 adjacent to the light scattering switching element 1; and an image generating element 3 for generating an image, wherein, in a projection mode, the image generated by the image generating element 3 sequentially passes through the light scattering switching element 1 and the light absorbing switching element 2 for being displayed. The present disclosure combines the light scattering switching element 1 and the light absorbing switching element 2 to form an electronic device with switchable modes, which may be switched between light shielding mode, light transmitting mode, or other gray-scale modes so as to achieve the effect of blocking external light or transmitting light. In addition, by combining with the image generating element 3, the electronic device may be provided with a projection function to achieve the effect of displaying images (including text or pictures, but not limited thereto). Therefore, the electronic device of the present disclosure is an electronic device with switchable modes, which may be used for sun visors and has the function of head-up display. In one embodiment, the image generating element 3 includes, for example, a projector or other suitable image generating elements.

More specifically, as shown in FIG. 1, when the electronic device of the present disclosure is used as a sun visor (such as a sun visor for vehicle riding), the image generating element 3 may be arranged adjacent to the windshield substrate G, and the light scattering switching element 1 and the light absorbing switching element 2 may be disposed between the image generating element 3 and the viewer E. Therefore, in the projection mode, the image generating element 3 may project an image onto the light scattering switching element 1 and the light absorbing switching element 2, which then passes through the light scattering switching element 1 and the light absorbing switching element 2 for display. By switching the light shielding mode, the light transmitting mode or other gray-scale modes of the light scattering switching element 1 and the light absorbing switching element 2, the penetration of light incident from the outside of the windshield substrate G may be selectively adjusted according to the requirements. In other words, when the electronic device is in the light shielding mode, it may be used to block most of the external light. When the electronic device is in the light transmitting mode, most of the external light will not be blocked and may pass through the electronic device. At this moment, the electronic device may be transparent and will not affect the line of sight of the driver. Therefore, there is no need to manually fold and store the sun visor when not in use.

In one embodiment of the present disclosure, as shown in FIG. 1, the electronic device may further include an anti-glare element 4, wherein the light scattering switching element 1 is disposed between the anti-glare element 4 and the light absorbing switching element 2. In addition, the light absorbing switching element 2 is closer to a viewing side (e.g., the viewer E) than the light scattering switching element 1 (or the anti-glare element 4). The anti-glare element 4 may be used to block most of the horizontally polarized light in the external light, so as to reduce the horizontally polarized light from passing through the electronic device and reaching the eyes of the viewer E, thereby reducing the occurrence of glare. In the present disclosure, the anti-glare element 4 may include a polarizing element, such as a non-switchable polarizing element or a switchable polarizing element, but it is not limited thereto. The switchable polarizing element includes, for example, a polarizing element that may be switched to a transmitting state or a polarization state.

The light scattering switching element 1 and the light absorbing switching element 2 of the present disclosure will be described in detail below.

Figure 2A:
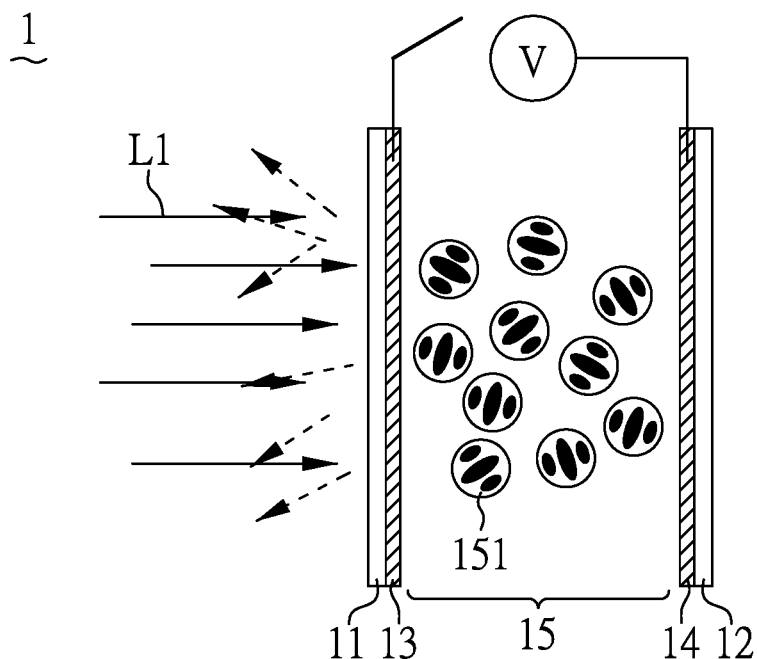
FIG. 2A and FIG. 2B schematically illustrate a light scattering switching element according to an embodiment of the present disclosure.
Figure 2B:
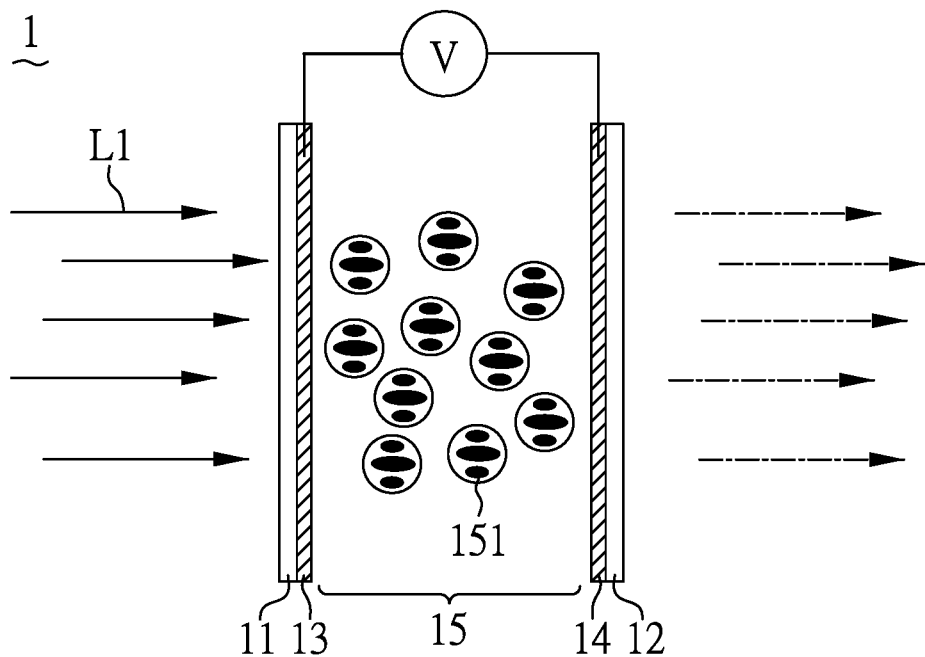

FIG. 2A and FIG. 2B schematically illustrate the light scattering switching element according to an embodiment of the present disclosure.

In one embodiment of the present disclosure, as shown in FIG. 2A and FIG. 2B, the light scattering switching element 1 may include: a first substrate 11; a second substrate 12 disposed corresponding to the first substrate 11; a first conductive layer 13 disposed on the first substrate 11; a second conductive layer 14 disposed on the second substrate 12; and a first light modulation layer 15 disposed between the first substrate 11 and the second substrate 12 or between the first conductive layer 13 and the second conductive layer 14, wherein the first light modulation layer 15 includes liquid crystal material 151 or other suitable adjustable light scattering materials. By applying a voltage to the first conductive layer 13 and the second conductive layer 14 to generate a vertical electric field, it is able to control the arrangement of the liquid crystal material 151 in the first light modulation layer 15, so that the light scattering switching element 1 may be switched between the hazing state and transmitting state.

In other embodiments (not shown), the first conductive layer 13 and the second conductive layer 14 may, for example, be formed on the same substrate, and the first conductive layer 13 and the second conductive layer 14 may, for example, be formed between the first substrate 11 and the first light modulation layer 15. The first conductive layer 13 and the second conductive layer 14 may be arranged in the same layer or different layers. When the first conductive layer 13 and the second conductive layer 14 are arranged in the same layer, the first conductive layer 13 and the second conductive layer 14 may have, for example, an In-Plane-Switching (IPS) structure, but it is not limited thereto. When the first conductive layer 13 and the second conductive layer 14 are arranged in different layers, the first conductive layer 13 and the second conductive layer 14 may have, for example, a Fringe Field Switching (FFS) structure, but it is not limited thereto.

Referring to FIG. 2A and FIG. 2B again, when there is no voltage applied to the first conductive layer 13 and the second conductive layer 14, as shown in FIG. 2A, the liquid crystal material 151 in the first light modulation layer 15 is, for example, not regularly arranged and, at this moment, most of the incident light L1 presents a scattering state when passing through the liquid crystal material 151 arranged in this way, so that the light scattering switching element 1 presents a hazing state. When a voltage (such as a vertical electric field) is applied to the first conductive layer 13 and the second conductive layer 14, as shown in FIG. 2B, the liquid crystal material 151 in the first light modulation layer 15 is, for example, arranged regularly (the long-axis direction of the liquid crystal material is arranged along the direction of the electric field, for example) and, at this moment, most of the incident light L1 may pass through the light scattering switching element 1, so that the light scattering switching element 1 is in a transmitting state. The above manner of switching the hazing state and the transmitting state of the light scattering switching element 1 is only an example, while it may be switched through other methods, for example.

In the present disclosure, the same or different materials may be used to prepare the first substrate 11 and the second substrate 12, and the materials of the first substrate 11 and the second substrate 12 may include glass, quartz, sapphire, ceramics, polycarbonate (PC), polyimide (PI), polyethylene terephthalate (PET), polymethylmethacrylate (PMMA), other suitable substrate materials or a combination thereof, but it is not limited thereto. In the present disclosure, the same or different materials may be used to prepare the first conductive layer 13 and the second conductive layer 14, and the materials of the first conductive layer 13 and the second conductive layer 14 may include transparent conductive layers, metal conductive layers or its combination, but it is not limited thereto. In the present disclosure, the liquid crystal material 151 of the first light modulation layer 15 may include Polymer Stabilized Cholesteric Texture (PSCT), Polymer-Dispersed Liquid Crystal (PDLC), Polymer Network Liquid Crystal (PNLC), other suitable liquid crystal materials, or a combination thereof, but it is not limited thereto.

Figure 3A:
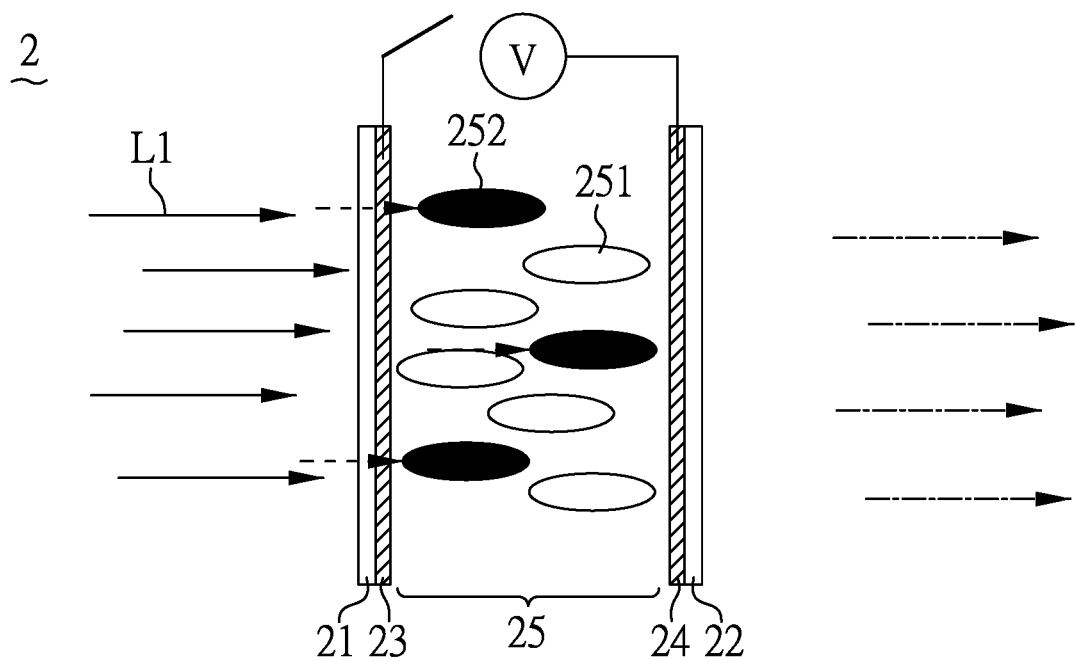
FIG. 3A and FIG. 3B schematically illustrate a light absorbing switching element according to an embodiment of the present disclosure.
Figure 3B:
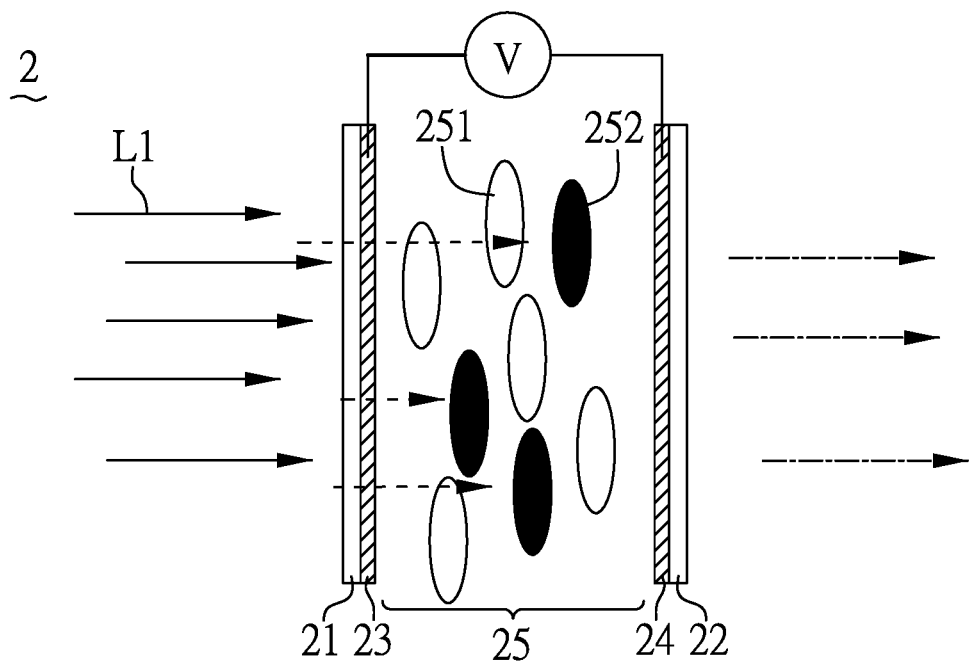

FIG. 3A and FIG. 3B schematically illustrate a light absorbing switching element according to an embodiment of the present disclosure.

In one embodiment of the present disclosure, as shown in FIG. 3A and FIG. 3B, the light absorbing switching element 2 may include: a third substrate 21; a fourth substrate 22 disposed corresponding to the third substrate 21; a third conductive layer 23 disposed on the third substrate 21; a fourth conductive layer 24 disposed on the fourth substrate 22; and a second light modulation layer 25 disposed between the third substrate 21 and the fourth substrate 22 or between the third conductive layer 23 and the fourth conductive layer 24, wherein the second light modulation layer 25 includes a liquid crystal material 251 and/or a dye material 252. By applying a voltage to the third conductive layer 21 and the fourth conductive layer 24 to generate a vertical electric field, it is able to control the arrangements of the liquid crystal material 251 and the dye material 252 in the second light modulation layer 25, so that the light absorbing switching element 2 may be switched between the absorbing state and the transmitting state. Similarly, in other embodiments (not shown), the third conductive layer 23 and the fourth conductive layer 24 may be formed on the same substrate; for example, the third conductive layer 23 and the fourth conductive layer 24 may be formed between the third substrate 21 and the second light modulation layer 25. The third conductive layer 23 and the fourth conductive layer 24 may be arranged in the same layer or different layers. When the third conductive layer 23 and the fourth conductive layer 24 are arranged in the same layer, the third conductive layer 23 and the fourth conductive layer 24 may have, for example, an In-Plane-Switching (IPS) structure, but it is not limited thereto. When the third conductive layer 23 and the fourth conductive layer 24 are arranged in different layers, the third conductive layer 23 and the fourth conductive layer 24 may have, for example, a Fringe Field Switching (FFS) structure, but it is not limited thereto.

Referring to FIG. 3A and FIG. 3B again, more specifically, when there is no voltage applied to the third conductive layer 23 and the fourth conductive layer 24, as shown in FIG. 3A, the long-axis direction of the liquid crystal material 251 and/or the dye material 252 in the second light modulation layer 25, for example, is approximately perpendicular to the polarization direction of the incident light L1 (such as the horizontal polarization direction, vertical polarization direction), and thus the incident light L1 is not easily absorbed by the dye material 252, so that the light absorbing switching element 2 presents a transmitting state. When a voltage is applied to the third conductive layer 23 and the fourth conductive layer 24, as shown in FIG. 3B, the long-axis direction of most of the liquid crystal material 251 and/or the dye material 252 in the second light modulation layer 25 is approximately parallel to the polarization direction of the incident light L1 (for example, vertical polarization direction), and thus the incident light L1 is easily absorbed by the dye material 252, so that the light absorbing switching element 2 presents an absorbing state or a gray-scale state.

In the present disclosure, the same or different materials may be used to prepare the third substrate 21 and the fourth substrate 22, and the materials of the third substrate 21 and the fourth substrate 22 are as described in the first substrate 11 or the second substrate 12, which thus will not be repeated here. In the present disclosure, the third conductive layer 23 and the fourth conductive layer 24 may be prepared using the same or different materials, and the materials of the third conductive layer 23 and the fourth conductive layer 24 are as described in the first conductive layer 13 or the second conductive layer 14, which thus will not be repeated here. In the present disclosure, the liquid crystal material 251 in the second light modulation layer 25 may include negative type liquid crystal, such as guest host type liquid crystal (GHLC), dye liquid crystal, but it is not limited thereto. In the present disclosure, the dye material 252 may include dichroic dye, and has an absorptivity for light having a wavelength ranging from 360 nm to 830 nm, for example. The absorbing color of the dye material 252 may include, for example, black, purple, orange, blue, other colors, or a combination thereof, but it is not limited thereto. The above manner of switching the absorbing state and the transmitting state of the light absorbing switching element 2 is only an example, while it may be switched through other methods, for example.

Figure 4:
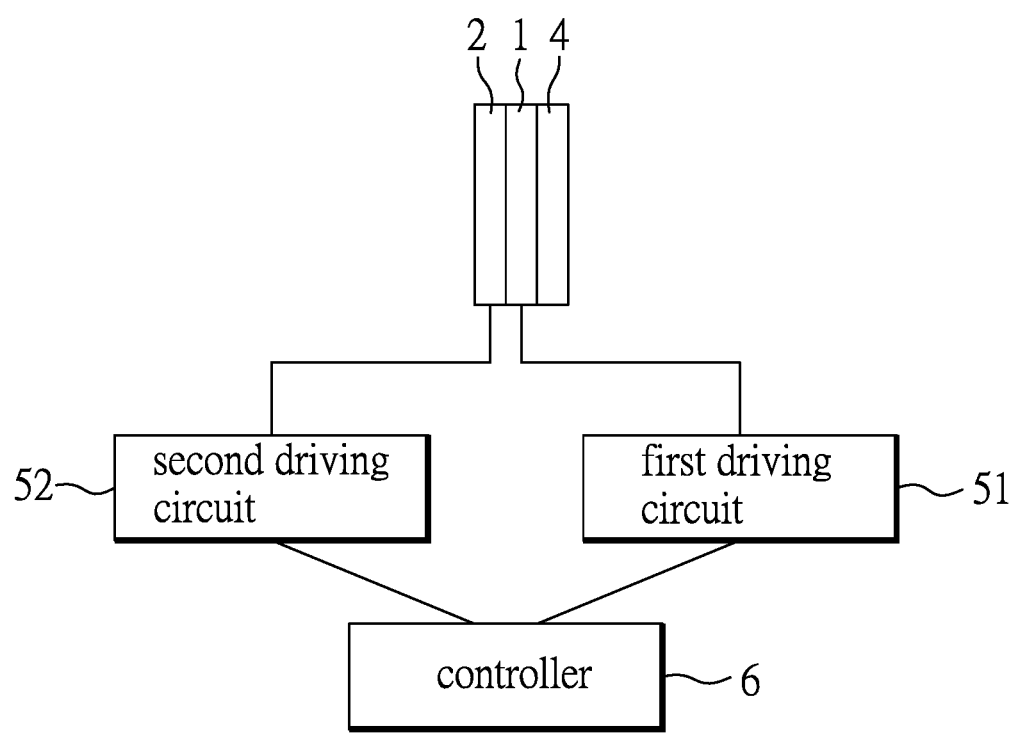
FIG. 4 is a schematic diagram of part of an electronic device according to an embodiment of the present disclosure.

FIG. 4 is a schematic diagram of part of an electronic device according to an embodiment of the present disclosure.

In one embodiment of the present disclosure, as shown in FIG. 4, the electronic device may include: a first driving circuit 51 electrically connected to the light scattering switching element 1; a second driving circuit 52 electrically connected to the light absorbing switching element 2; and a controller 6 electrically connected to the first driving circuit 51 and the second driving circuit 52. The first driving circuit 51 and the second driving circuit 52 may respectively provide different voltages to the light scattering switching element 1 and the light absorbing switching element 2 under the control of the controller 6 (such as a microprocessor MCU, but it is not limited thereto). In other embodiments, the first driving circuit 51 and the second driving circuit 52 may be controlled by different controllers, for example.

More specifically, as shown in FIG. 2A, FIG. 2B and FIG. 4, the first driving circuit 51 may be electrically connected to the first conductive layer 13 and the second conductive layer 14 of the light scattering switching element 1, respectively, so as to provide voltage to the first conductive layer 13 and the second conductive layer 14, respectively, thereby achieving the effect of controlling the liquid crystal material 151 in the first light modulation layer 15 so that the light scattering switching element 1 may be switched between the hazing state and the transmitting state. Similarly, as shown in FIG. 3A, FIG. 3B and FIG. 4, the second driving circuit 52 may be electrically connected to the third conductive layer 23 and the fourth conductive layer 24 of the light absorbing switching element 2, respectively, so as to provide voltage to the third conductive layer 23 and the fourth conductive layer 24, respectively, thereby achieving the effect of controlling the liquid crystal material 251 and the dye material 252 in the second light modulation layer 25, so that the light absorbing switching element 2 may be switched between the absorbing state and the transmitting state.

Figure 5A:
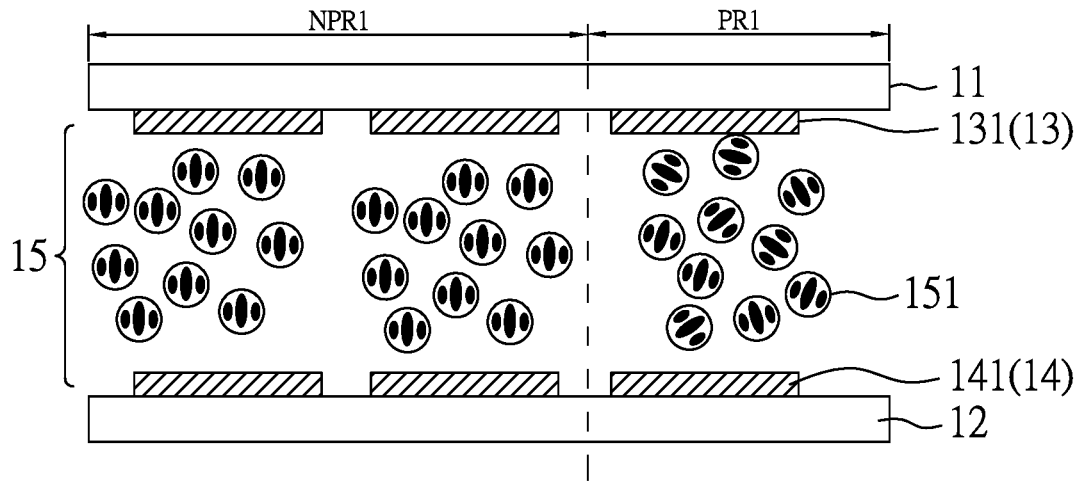
FIG. 5A is a schematic diagram of a light scattering switching element according to an embodiment of the present disclosure.
Figure 5B:
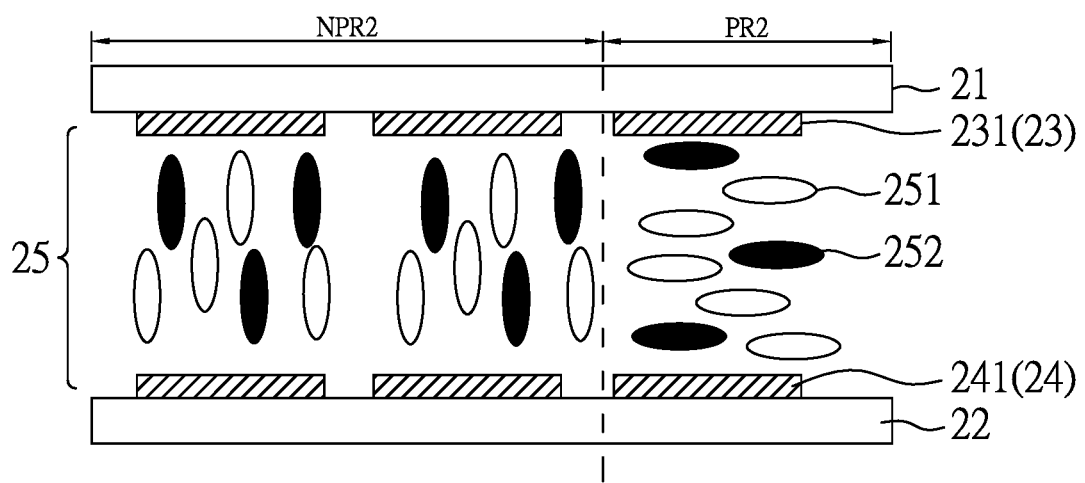
FIG. 5B is a schematic diagram of a light absorbing switching element according to an embodiment of the present disclosure.

FIG. 5A is a schematic diagram of a light scattering switching element according to an embodiment of the present disclosure. FIG. 5B is a schematic diagram of a light absorbing switching element according to an embodiment of the present disclosure.

In one embodiment of the present disclosure, the light scattering switching element 1 and the light absorbing switching element 2 may each be designed to be partitioned and driven. As shown in FIG. 5A, the first conductive layer 13 of the light scattering switching element 1 may include a plurality of first electrodes 131, which are separated and electrically insulated from each other, and the second conductive layer 14 of the light scattering switching element 1 may include a plurality of second electrodes 141, which are separated and electrically insulated from each other. The plurality of first electrodes 131 and the plurality of second electrodes 141 overlap, for example, in the normal direction of the first substrate 12, and voltages may be selectively applied to different first electrodes 131 and second electrodes 141 to control the liquid crystal material 151 in the corresponding region so that the liquid crystal material 151 in different region may present a hazing state or a transmitting state, thereby achieving the effect of separate driving in different regions and switching between the hazing state and the transmitting state. More specifically, as shown in FIG. 5A, when in the projection mode, the light scattering switching element 1 may include a projection region PR1 and a non-projection region NPR1, wherein no voltage is applied to the first electrode 131 and the second electrode 131 corresponding to the projection region PR1 so that the voltage difference therebetween is 0, and a voltage is applied to the first electrode 131 and the second electrode 141 corresponding to the non-projection region NPR1 so that the voltage difference therebetween is greater than 0. Therefore, the liquid crystal in the light scattering switching element 1 corresponding to the projection region PR1 may present a hazing state, which is beneficial for the image generating element to generate images, and the light scattering switching element 1 may present a transmitting state at the position corresponding to the non-projection region NPR1 so as to facilitate light penetration.

Similarly, as shown in FIG. 5B, the third conductive layer 23 of the light absorbing switching element 2 may include a plurality of third electrodes 231, which are separated and electrically insulated from each other, and the fourth conductive layer 24 of the light absorbing switching element 2 may include a plurality of fourth electrodes 241, which are separated and electrically insulated from each other. The plurality of third electrodes 231 and the plurality of fourth electrodes 241 overlap, for example, in the normal direction of the third substrate 22. Therefore, voltages may be selectively applied to different third electrodes 231 and fourth electrodes 241 to control the liquid crystal material 251 and the dye material 252 in the corresponding region so that different region may present the transmitting state or the absorbing state thereby achieving the effect of separate driving in different regions and switching between the transmitting state and the absorbing state. More specifically, as shown in FIG. 5B, when in the projection mode, the light absorbing switching element 2 may include a projection region PR2 and a non-projection region NPR2, wherein a voltage is applied to the third electrode 231 and the fourth electrode 241 corresponding to the projection region PR2 so that the voltage difference therebetween is greater than 0, and no voltage is applied to the third electrode 231 and the fourth electrode 241 corresponding to the non-projection region NPR2 so that the voltage difference therebetween is 0. Therefore, the light absorbing switching element 2 corresponding to the projection region PR2 may present an absorbing state or a gray-scale state so as to facilitate the image generating element to generate an image, and the light scattering switching element 2 corresponding to the non-projection region NPR2 may present a transmitting state so as to facilitate light transmitting, but it is not limited thereto. As mentioned above, in the projection mode, the image generated by the image generating element 3 will sequentially pass through the light scattering switching element 1 and the light absorbing switching element 2 to be displayed. The projection region PR1 of the light scattering switching element 1 and the projection region PR2 of the light absorbing switching element 2 may, for example, be the region where the image passes through the light scattering switching element 1 and the light absorbing switching element 2 to be displayed, while the non-projection region NPR1 of the light scattering switching element 1 and the non-projection region NPR2 of the light absorbing switching element 2 are the other regions after deducting the aforementioned projection regions (projection region PR1 or projection region PR2).

The electronic device of the present disclosure (as shown in FIG. 1) is an electronic device with switchable modes, for example, it may be switched between a light shielding mode and a light transmitting mode. In addition, since the electronic device of the present disclosure is provided with the image generating element 3, it may be switched to a projection mode to display images when necessary. The corresponding component relationship between each mode is shown in Table 1 below.

TABLE 1

| Mode | Image generating element | Light scattering switching element | Light absorbing switching element |
| --- | --- | --- | --- |
| Light shielding mode | OFF | Hazing state/ Transmitting state | Absorbing state |
| Light transmitting mode | OFF | Transmitting state | Transmitting state |
| Projection mode | ON | Micro-hazing state (projection region) Transmitting state (non-projection region) | Gray-scale state (projection region) Transmitting state (non-projection region) |

When the electronic device is in the light shielding mode, for example, the image generating element 3 does not need to be turned on, the light scattering switching element 1 may be in the hazing state or the transmitting state, and the light absorbing switching element 2 may be in the absorbing state. More specifically, in the light shielding mode, when the light scattering switching element 1 is in a hazing state, its haze value may be greater than 70%, such as greater than 75% or 80%, but it is not limited thereto. In the light shielding mode, when the light scattering switching element 1 is in the hazing state, its haze value may be between 70% and 99% (70%≤haze value≤99%) or between 75% and 95% (75%≤haze value≤95%), but it is not limited thereto. In other embodiments, the light scattering switching element 1 may also be in the transmitting state. In the light shielding mode, the light transmittance of the light absorbing switching element 2 may be smaller than 20%, such as smaller than 15% or 10%, but it is not limited thereto. In the light shielding mode, the light transmittance of the light absorbing switching element 2 may be between 1% and 20% (1%≤transmittance≤20%) or between 5% and 15% (5%≤transmittance≤15%), but it is not limited thereto. When the haze value of the light scattering switching element 1 and the transmittance of the light absorbing switching element 2 meet the aforementioned ranges, the electronic device may have a better light shielding effect, but it is not limited thereto. The haze value of the light scattering switching element 1 and the transmittance of the light absorbing switching element 2 may be adjusted according to the habit of the user.

When the electronic device is in the light transmitting mode, the image generating element 3 does not need to be turned on, while the light scattering switching element 1 is in the transmitting state and the light absorbing switching element 2 is in the transmitting state. More specifically, in the light transmitting mode, the haze value of the light scattering switching element 1 may be smaller than 10%, such as smaller than 8% or 5%, but it is not limited thereto. In the light transmitting mode, the haze value of the light scattering switching element 1 may be between 1% and 9% (1%≤haze value≤9%) or between 2% and 8% (2%≤haze value≤8%), but it is not limited thereto. In the light transmitting mode, the light transmittance of the light absorbing switching element 2 may be greater than 40%, for example, the light transmittance may be 40% to 70%, but not limited thereto. In the light transmitting mode, the transmittance of the light absorbing switching element 2 may be between 45% and 95% (45%≤transmittance≤95%) or between 50% and 90% (50%≤transmittance≤90%), but it is not limited thereto. When the haze value of the light scattering switching element 1 and the transmittance of the light absorbing switching element 2 meet the aforementioned ranges, the electronic device may be provided with a better light transmitting effect, but it is not limited thereto. The haze value of the light scattering switching element 1 and the transmittance of the light absorbing switching element 2 may be adjusted according to the habit of the user.

Figure 6A:
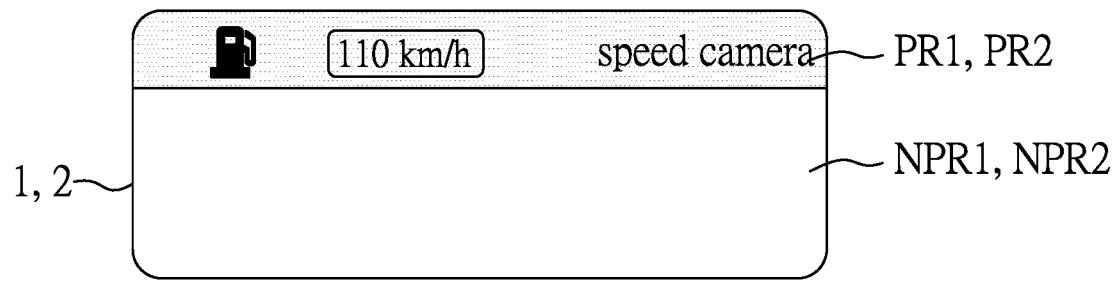
FIG. 6A and FIG. 6B schematically illustrate an electronic device in a projection mode according to an embodiment of the present disclosure.

In the present disclosure, as shown in FIG. 5A and FIG. 5B, the light scattering switching element 1 may have a projection region PR1 and a non-projection region NPR1. The light absorbing switching element 2 may have a projection region PR2 and a non-projection region NPR2. The projection region PR1 of the light scattering switching element 1 and the projection region PR2 of the light absorbing switching element 2 are defined as described above, and the non-projection region NPR1 of the light scattering switching element 1 and the non-projection region NPR2 of the light absorbing switching element 2 are defined as described above, so that a detailed description is deemed unnecessary. The projection region PR1 of the light scattering switching element 1 and the projection region PR2 of the light absorbing switching element 2 may substantially overlap (as shown in FIG. 6A subsequently), and the non-projection region NPR1 of the light scattering switching element 1 and the non-projection region NPR2 of the light absorbing switching element 2 may substantially overlap (as shown in FIG. 6A subsequently). In some embodiments, in the projection mode, the image generating element 3 is turned on, and the light scattering switching element 1 presents a micro-hazing state in the projection region PR1 and presents a transmitting state in the non-projection region NPR1, while the light absorbing switching element 2 presents, for example, a gray-scale state in the projection region PR2 and presents a transmitting state in the non-projection region NPR2, but it is not limited thereto. More specifically, in the projection mode, the haze value of the projection region PR1 of the light scattering switching element 1 may be 5% to 20% (5%≤haze value rate≤20%), for example, 8% to 15% or 8% to 10%, so as to present a micro-hazing state, but it is not limited thereto, the haze value may be adjusted according to the habit of the user. In the projection mode, the transmittance of the projection region PR2 of the light absorbing switching element 2 may be greater than 40%, for example, the transmittance may be 40% to 99% (40%≤transmittance≤99%), but it is not limited thereto and may be adjusted according to the habit of the user. When the haze value of the projection region PR1 of the light scattering switching element 1 and the transmittance of the projection region PR2 of the light absorbing switching element 2 meet the above ranges, better projection effects may be obtained in the projection regions PR1 and PR2, but it is not limited thereto and may be adjusted according to the habit of the user. In addition, in the projection mode, the haze value of the non-projection region NPR1 of the light scattering switching element 1 may be smaller than 10%, for example, smaller than 8% or 5%, but it is not limited thereto. In the projection mode, the transmittance of the non-projection region NPR2 of the light absorbing switching element 2 may be greater than 40%, for example, the transmittance may be 40% to 70% (40%≤ transmittance≤70%), but it is not limited thereto. When the haze value of the non-projection region NPR1 of the light scattering switching element 1 and the transmittance of the non-projection region NPR2 of the light absorbing switching element 2 meet the above ranges, better light transmitting effects may be achieved in the non-projection regions NPR1 and NPR2, but it is not limited thereto and may be adjusted according to the habit of the user. In one embodiment of the present disclosure, in the projection mode, the haze value of the projection region PR1 of the light scattering switching element 1 may be greater than the haze value of the non-projection region NPR1 of the light scattering switching element 1.

Figure 6B:
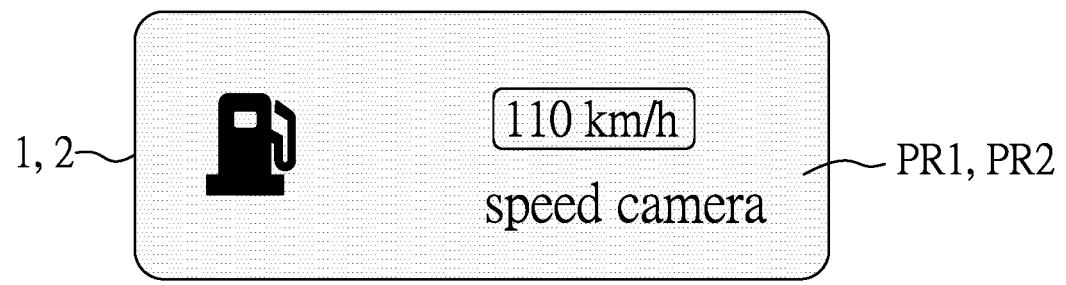

FIG. 6A and FIG. 6B schematically illustrate an electronic device in a projection mode according to an embodiment of the present disclosure.

In one embodiment, as shown in FIG. 6A, in the projection mode, the projection region PR1 of the light scattering switching element 1 overlaps the projection region PR2 of the light absorbing switching element 2, while the non-projection region NPR1 of the light scattering switching element 1 overlaps the non-projection region NPR2 of the light absorbing switching element 2. The image generating element 3 (as shown in FIG. 1) may project the image to the projection region PR1 and the projection region PR2 based on the control, so that the driver may obtain information (text or image) through the electronic device, such as speed display, speed camera warning, etc., but it is not limited thereto, while the non-projection regions NPR1 and NPR2 may each be in a transmitting state. In one embodiment, the area of the non-projection regions NPR1 and NPR2 may be different from or the same as the area of the projection regions PR1 and PR2. In one embodiment, the area of the non-projection regions NPR1 and NPR2 may be greater than the area of the projection regions PR1 and PR2, but it is not limited thereto. In one embodiment (not shown), the area of the non-projection regions NPR1 and NPR2 may be smaller than the area of the projection regions PR1 and PR2, but it is not limited thereto.

In one embodiment, the position of the projection region PR1 and the projection region PR2 may be adjusted according to the requirements, for example, to the upper side, the lower side, the left side, the right side or the middle. In one embodiment, the area of the projection regions PR1 and PR2 may be reduced or enlarged according to the requirements. In one embodiment, as shown in FIG. 6B, in the projection mode, the light scattering switching element 1 and the light absorbing switching element 2 may each not have a non-projection region; that is, the light scattering switching element 1 and the light absorbing switching element 2 only have a projection region PR1 and a projection region PR2, respectively. At this moment, the image generating element 3 (as shown in FIG. 1) may project and display images in the entire region, but it is not limited thereto. In one embodiment (not shown), the light scattering switching element 1 and the light absorbing switching element 2 may have a plurality of projection regions PR1 and a plurality of projection regions PR2, respectively, and the plurality of projection regions PR1 and the plurality of projection regions PR2 may be separated from each other, for example, in different regions.

Figure 7A:
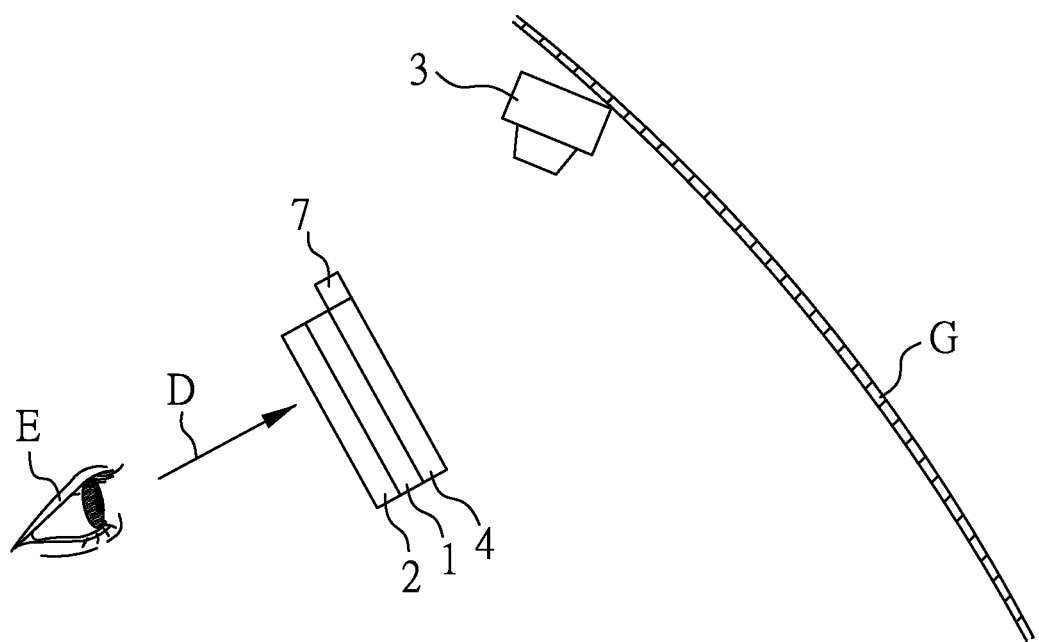
FIG. 7A is a schematic diagram of part of an electronic device according to an embodiment of the present disclosure.
Figure 7B:
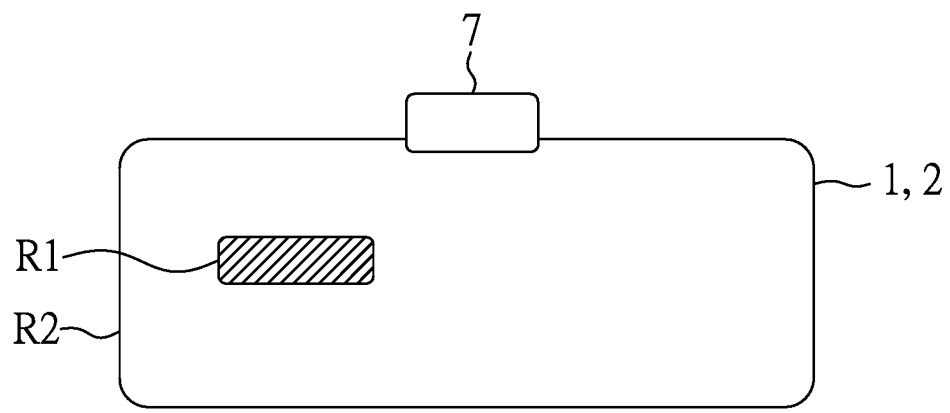
FIG. 7B is schematic diagram illustrating part of FIG. 7A.

FIG. 7A is a schematic diagram of part of an electronic device according to an embodiment of the present disclosure, and FIG. 7B is schematic diagram illustrating part of FIG. 7A, wherein the electronic device in FIG. 7A and FIG. 7B is similar to that in FIG. 1 except for the following differences.

In one embodiment of the present disclosure, as shown in FIG. 7A and FIG. 7B, the electronic device may include a detection module 7 disposed adjacent to the light scattering switching element. The detection module 7 may be used to detect the position of the viewer E, and the electronic device is switched to a light shielding mode in a specific region (such as the first region R1) through calculation, but it is not limited thereto.

More specifically, FIG. 7B is, for example, a schematic diagram of the electronic device viewed from the line of sight direction D of the viewer E in FIG. 7A. The electronic device may include a first region R1 and a second region R2. When the detection module 7 detects the position of the viewer E and performs calculation, the electronic device may be switched to a light shielding mode in the first region R1, and maintains the second region R2 in the light transmitting mode, but it is not limited thereto. As a result, while blocking light, the area of the light shielding region (such as the first region R1) may be reduced, so as to improve the openness of the overall line of sight. In one embodiment, the area of the first region R1 may be smaller than the area of the second region R2, but it is not limited thereto.

The aforementioned specific embodiments should be construed as merely illustrative, and not limiting the rest of the present disclosure in any way, and the features between different embodiments may be mixed and matched as long as they do not conflict with each other.

The invention claimed is:

1. An electronic device with switchable modes, comprising:
   a light scattering switching element;
   a light absorbing switching element disposed adjacent to the light scattering switching element; and
   an image generating element for generating an image,
   wherein, in a projection mode, the image generated by the image generating element sequentially passes through the light scattering switching element and the light absorbing switching element to be displayed,
   wherein, in the projection mode, each of the light scattering switching element and the light absorbing switching element includes a projection region, and the image is displayed on the projection regions,
   wherein, in the projection mode, a haze value of the projection region of the light scattering switching element is greater than that of a non-projection region of the light scattering switching element.

2. The electronic device as claimed in claim 1, wherein, in the projection mode, a haze value of the projection region of the light scattering switching element is 5% to 20%, and a transmittance of the projection region of the light absorbing switching element is greater than 40%.

3. The electronic device as claimed in claim 1, wherein, in the projection mode, the light absorbing switching element further includes a non-projection region, and the non-projection regions are other regions after deducting the projection regions, a haze value of the non-projection region of the light scattering switching element is smaller than 10%, and a transmittance of the non-projection region of the light absorbing switching element is greater than 40%.

4. The electronic device as claimed in claim 3, wherein the non-projection region of the light scattering switching element overlaps the non-projection region of the light absorbing switching element.

5. The electronic device as claimed in claim 1, wherein, in a light shielding mode, a transmittance of the light absorbing switching element is smaller than 20%, and a haze value of the light scattering switching element is greater than 70%.

6. The electronic device as claimed in claim 1, wherein, in a light transmitting mode, a haze value of the light scattering switching element is smaller than 10%, and a transmittance of the light absorbing switching element is greater than 40%.

7. The electronic device as claimed in claim 1, further comprising an anti-glare element, wherein the light scattering switching element is disposed between the anti-glare element and the light absorbing switching element, and the anti-glare element includes polarizing element.

8. The electronic device as claimed in claim 7, wherein the light absorbing switching element is closer to a viewing side than the anti-glare element.

9. The electronic device as claimed in claim 1, further comprising a detection module disposed adjacent to the light scattering switching element.

10. The electronic device as claimed in claim 1, wherein the light scattering switching element includes: a first substrate; a second substrate disposed corresponding to the first substrate; a first conductive layer disposed on the first substrate; a second conductive layer disposed on the second substrate; and a first light modulation layer disposed between the first conductive layer and the second conductive layer.

11. The electronic device as claimed in claim 10, wherein the first light modulation layer includes a liquid crystal material.

12. The electronic device as claimed in claim 10, wherein the light absorbing switching element includes: a third substrate; a fourth substrate disposed corresponding to the third substrate; a third conductive layer disposed on the third substrate; a fourth conductive layer disposed on the fourth substrate; and a second light modulation layer disposed between the third conductive layer and the fourth conductive layer.

13. The electronic device as claimed in claim 12, wherein the second light modulation layer includes a liquid crystal material and a dye material.

14. The electronic device as claimed in claim 12, further comprising: a first driving circuit electrically connected to the light scattering switching element; a second driving circuit electrically connected to the light absorbing switching element; and a controller electrically connected to the first driving circuit and the second driving circuit.

15. The electronic device as claimed in claim 14, wherein the first driving circuit is electrically connected to the first conductive layer and the second conductive layer of the light scattering switching element, respectively, and the second driving circuit is electrically connected to the third conductive layer and the fourth conductive layer of the light absorbing switching element, respectively.

16. The electronic device as claimed in claim 10, wherein the first conductive layer of the light scattering switching element includes a plurality of first electrodes separated and electrically insulated from each other, the second conductive layer of the light scattering switching element includes a plurality of second electrodes separated and electrically insulated from each other, and the plurality of first electrodes and the plurality of second electrodes overlap in a normal direction of the first substrate.

17. The electronic device as claimed in claim 10, wherein the third conductive layer of the light absorbing switching element includes a plurality of third electrodes separated and electrically insulated from each other, the fourth conductive layer of the light absorbing switching element includes a plurality of fourth electrodes separated and electrically insulated from each other, and the plurality of third electrodes and the plurality of fourth electrodes overlap in a normal direction of the third substrate.

18. The electronic device as claimed in claim 1, wherein the projection region of the light scattering switching element overlaps the projection region of the light absorbing switching element.

* * * * *